US010457030B2

(12) United States Patent
Li

(10) Patent No.: US 10,457,030 B2
(45) Date of Patent: Oct. 29, 2019

(54) METHOD FOR MANUFACTURING BAMBOO FRAMEWORK BODY

(71) Applicant: Fujian Shuangyi Bamboo and Wood Development Co., Ltd, Nanping (CN)

(72) Inventor: Zhisheng Li, Nanping (CN)

(*) Notice: Subject to any disclaimer, the term of this patent is extended or adjusted under 35 U.S.C. 154(b) by 153 days.

(21) Appl. No.: 15/693,154

(22) Filed: Aug. 31, 2017

(65) Prior Publication Data

US 2019/0022992 A1 Jan. 24, 2019

(30) Foreign Application Priority Data

Jul. 22, 2017 (CN) .......................... 2017 1 0603141

(51) Int. Cl.
| B32B 37/12 | (2006.01) |
| B27J 1/00 | (2006.01) |
| B32B 38/00 | (2006.01) |
| A47G 1/14 | (2006.01) |
| A47G 1/06 | (2006.01) |

(52) U.S. Cl.
CPC .................. *B32B 37/12* (2013.01); *B27J 1/00* (2013.01); *B32B 38/0004* (2013.01); *B32B 38/0008* (2013.01); *A47G 1/06* (2013.01); *A47G 1/0633* (2013.01); *A47G 1/14* (2013.01); *A47G 1/141* (2013.01); *Y10T 156/1002* (2015.01)

(58) Field of Classification Search
CPC . B27J 1/00; A47G 1/06; A47G 1/0633; A47G 1/14; A47G 1/141; A47G 2001/0677; Y10T 156/1002
See application file for complete search history.

(56) References Cited

FOREIGN PATENT DOCUMENTS

CN 102145501 A * 8/2011
CN 108717290 A * 10/2018

* cited by examiner

*Primary Examiner* — Carson Gross
(74) *Attorney, Agent, or Firm* — W&K IP

(57) ABSTRACT

The present invention relates to a method for manufacturing a bamboo framework body to solve the technical problem of low production efficiency of the existing bamboo framework body. The present invention has the first technical solution of bending a bamboo board into a U-shaped board, cutting the U-shaped board into several U-shaped units, and finally arranging a connecting rod at or close to an opening of the U-shaped unit to make into a bamboo framework body. The present invention has the second technical solution of gluing and stacking plural single bamboo boards and laminating them into a U-shaped board directly; cutting the U-shaped board into several U-shaped units; and finally arranging a connecting rod at or close to an opening of the U-shaped unit to make into a bamboo framework body.

8 Claims, 2 Drawing Sheets

METHOD FOR MANUFACTURING BAMBOO FRAMEWORK BODY

CROSS-REFERENCE TO RELATED APPLICATIONS

This application claims priority to Chinese Patent Application No. 201710603141.6 with a filing date of Jul. 22, 2017, designating the United States, now pending. The content of the aforementioned applications, including any intervening amendments thereto, are incorporated herein by reference.

TECHNICAL FIELD

The present invention relates to a field of processing technologies for bamboo frameworks, and in particular, to a method for manufacturing a bamboo framework body.

BACKGROUND OF THE PRESENT INVENTION

The Chinese patent discloses a bamboo frame shaping process (No. 2015108717290), including the following steps: heating a fixed die and a movable die to an appropriate temperature; preparing bamboo strips; arranging bamboo strips; disposing the bamboo strips and assembling the dies; shaping; and demoulding. This technology solves the technical problems that the existing bamboo frame is manually weaved, the bamboo material needs to be cut into relatively thin flat bamboo strips, the processing is inconvenient and the working efficiency is low. Moreover, this technology has the following defects.

1. To produce each bamboo frame, a series of process flows of preparing bamboo strips, arranging bamboo strips, disposing the bamboo strips and assembling the dies, shaping and demoulding is necessary, which cannot effectively increase the production efficiency of the bamboo frame.

2. In the process of arranging and disposing the bamboo strips and assembling the dies, the displacement tends to occur between adjacent inner and outer bamboo strips, an alignment error is large in two end portions of the bamboo strips, a defective rate is high, and the product quality cannot be effectively controlled.

3. The bamboo strip is heated and softened by heat transfer among the fixed die, the movable die and the bamboo strip. When the bamboo frame to be shaped has a relatively thick cross section, uneven heating tends to occur, particularly a rebounding stress of the bamboo strip at the center of the cross section of the bamboo frame cannot be effectively eliminated.

SUMMARY OF PRESENT INVENTION

Based on the above defects in the prior art, the present invention provides a method for manufacturing a bamboo framework body. This method can effectively shorten working hours for the bamboo framework body, and increase the production efficiency and product quality.

The present invention has the first technical solution as follows. A method for manufacturing a bamboo framework body includes the steps of bending a bamboo board into a U-shaped board using the bamboo board bending technology, cutting the U-shaped board into several U-shaped units, arranging a connecting rod at an opening of the U-shaped unit to form a closed bamboo framework body; or arranging a connecting rod close to an opening of the U-shaped unit, thereby forming a bamboo framework body with a supporting foot. The method specifically includes the following steps.

S1: bending the bamboo board to form a U-shaped board.

A multilayer bamboo board commercially available or one produced before the step S1 is used. The process for manufacturing a bamboo board includes: coating glue on a plurality of single bamboo boards, and then stacking the plurality of glued single bamboo boards, and putting them in a hot-embossing machine to manufacture a multilayer flat bamboo board.

Prior to bending, it needs to microwave heat and soften the multilayer bamboo board, to prevent the bamboo board from cracking during bending. The bamboo board is bent step by step, to avoid surface cracking caused by short-time bending.

S2: trimming two ends of the U-shaped board, such that its end portion is smooth; or processing the two ends of the U-shaped board into supporting end portions.

S3: cutting the U-shaped board into several U-shaped units.

Usually, the U-shaped board is cut uniformly in a direction of a slitting axis of the U-shaped board by a device such as a multiple blade saw.

S4: arranging a connecting rod at an opening of the U-shaped unit, to form a closed bamboo framework body; or arranging a connecting rod close to an opening of the U-shaped unit, thereby forming the bamboo framework body with a supporting foot. The final finished product is formed by grinding, polishing and painting the formed bamboo framework body.

The first technical solution of the present invention improves the production efficiency mainly by the following facts.

(1) In the bamboo board making stage, the bamboo board is shaped rapidly according to the existing process. Due to mature production process of the bamboo board, its production efficiency is relatively high. Compared with the prior art in which the production of each bamboo framework needs the processes of arranging and placing the bamboo strips, the working hours may be shortened greatly.

(2) In the bending and shaping stages, the entire bamboo board is bent to be shaped, which corresponds to bend and shape the plurality of U-shaped units. Compared with the prior art in which each framework unit needs to be bent and shaped, the present invention saves much working hours.

(3) In the end trimming stage, prior to cutting, the two ends of the U-shaped board are trimmed, which corresponds to trim the two ends of the plurality of U-shaped units at the same time. On the one hand, the working hours can be shortened effectively, and the production efficiency is increased. On the other hand, the standardized production can be realized, and the working accuracy of the supporting end portion is increased. The present invention solves the problem of machining error caused by the separate manual trimming in the prior art.

(4) In the stage of cutting the U-shaped board, the multiple blade saw is used to cut the U-shaped board into several U-shaped units at a time, with high efficiency and high quality.

(5) In the stage of bending the bamboo board into the U-shaped board, the bamboo board is microwave heated and softened, such that the bamboo board is heated uniformly, which contributes to the elimination of a rebounding stress of the U-shaped board.

The present invention has the second technical solution as follows. A method for manufacturing a bamboo framework body includes the steps of gluing and stacking plural single bamboo boards and laminating them into a U-shaped board directly, i.e. making a U-shaped board by the multilayer single bamboo boards directly; cutting the U-shaped board into several U-shaped units, arranging a connecting rod at an opening of the U-shaped unit to form a closed bamboo framework body; or arranging a connecting rod close to an opening of the U-shaped unit, thereby forming a bamboo framework body with a supporting foot. The method specifically includes the following steps.

S1: gluing and successively stacking the plural single bamboo boards to form a multiplayer superposed board; bending and shaping the multiplayer superposed board on a special shape forming machine to make into a U-shaped board; the special shape forming machine is provided with a microwave heating device to heat the plural single boards uniformly.

S2: trimming two ends of the U-shaped board, such that its end portion is smooth; or processing the two ends of the U-shaped board into supporting end portions.

The two ends of the U-shaped board can be trimmed by a slot milling machine at the same time.

S3: cutting the U-shaped board into several U-shaped units.

Usually, the U-shaped board is cut uniformly in a direction of a slitting axis of the U-shaped board by adopting a device such as a multiple blade saw.

S4: arranging a connecting rod at an opening of the U-shaped unit, to form a closed bamboo framework body; or arranging a connecting rod close to an opening of the U-shaped unit, thereby forming the bamboo framework body with a supporting foot. The final finished product is formed by grinding, polishing and painting the formed bamboo framework body.

The second technical solution of the present invention is mainly to improve the step S1 in the first technical solution and has the same other steps as the first technical solution.

Compared with the first technical solution according to the present invention, the second technical solution improves the production efficiency mainly by gluing and stacking the plural single bamboo boards and directly laminating into the U-shaped board in the stage of shaping the U-shaped board, such that the shaping process of the U-shaped board is further simplified, which not only effectively shortens the production time of the U-shaped board, but also reduces the shaping difficulty of the U-shaped board, and avoids the problem of cracking in the case that the bamboo board is bent into the U-shaped board.

Figure 1:
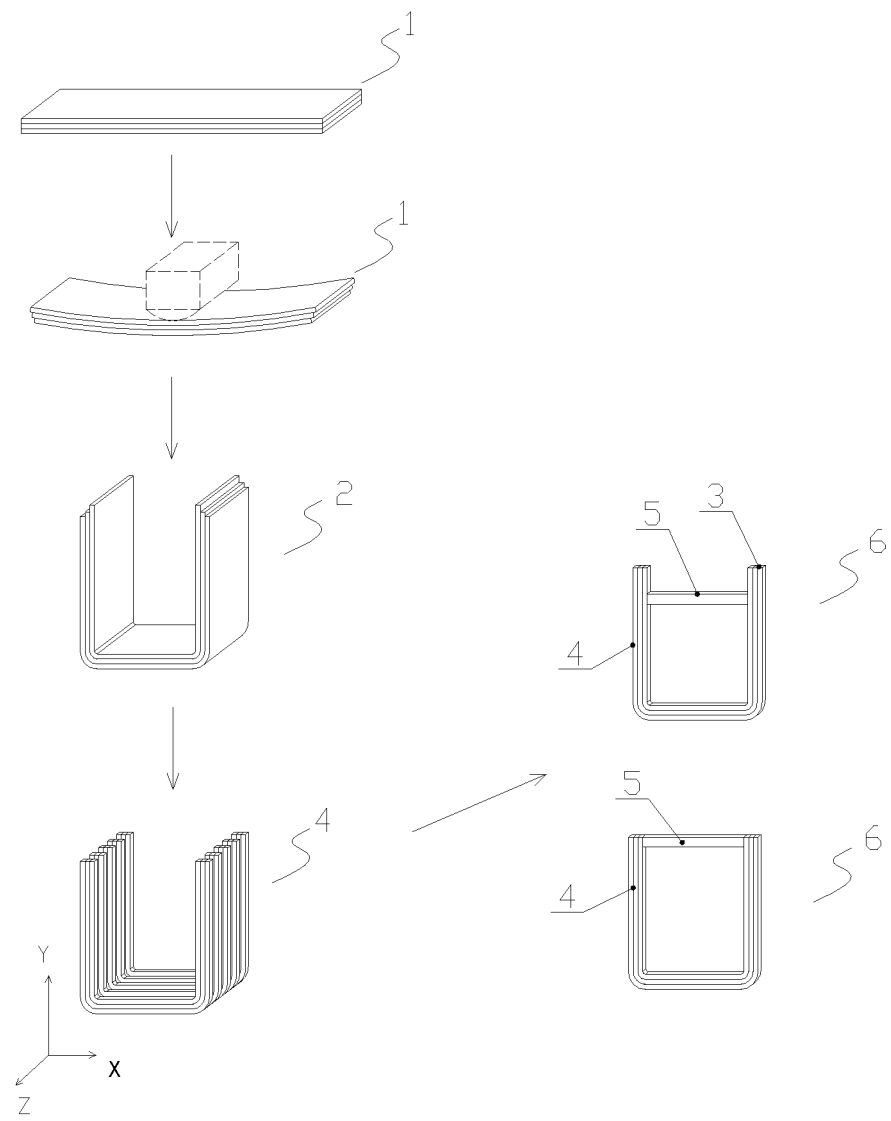
FIG. 1 is a schematic diagram showing the process for producing a bamboo framework body by using a bamboo board in the first embodiment.

Reference numerals: 1—bamboo board, 2—U-shaped board, 3—supporting end portion, 4—U-shaped unit, 5—connecting rod, 6—bamboo framework body, 10—three single boards, 11—three-layer superposed board.

DETAILED DESCRIPTION OF PREFERRED EMBODIMENTS

In order to explain the technical contents, the object and effects to be realized of the present invention in detail, the present invention will be explained further in detail in combination with the embodiments and drawings.

First Embodiment

As shown in FIG. 1, a method for producing a bamboo framework body using a three-layer composite bamboo board, including the following steps of:

S1: bending the bamboo board 1 to form a U-shaped board 2.

The bamboo board 1 is a multilayer bamboo board commercially available or the one manufactured by coating glue on three single bamboo boards, and then stacking the glued three single bamboo boards, and putting them in a hot-embossing machine.

Prior to bending, it needs to microwave heat and soften the bamboo board 1. The bamboo board is bent step by step, to avoid cracking during bending.

S2: trimming two ends of the U-shaped board 2, such that its end portion is smooth; or processing the two ends of the U-shaped board 2 into supporting end portions 3.

S3: cutting the U-shaped board 2 into a plurality of U-shaped units 4.

Usually, the U-shaped board 2 is cut uniformly in a direction of a Z axis of the U-shaped board 2 by a device such as a multiple blade saw.

S4: arranging a connecting rod 5 at an opening of the U-shaped unit 4, to form a closed bamboo framework body 6; or arranging a connecting rod 5 close to an opening of the U-shaped unit 4, thereby forming a bamboo framework body 6 with a supporting end portion 3. The final finished product is formed by grinding, polishing and painting the formed bamboo framework body 6.

Second Embodiment

Figure 2:
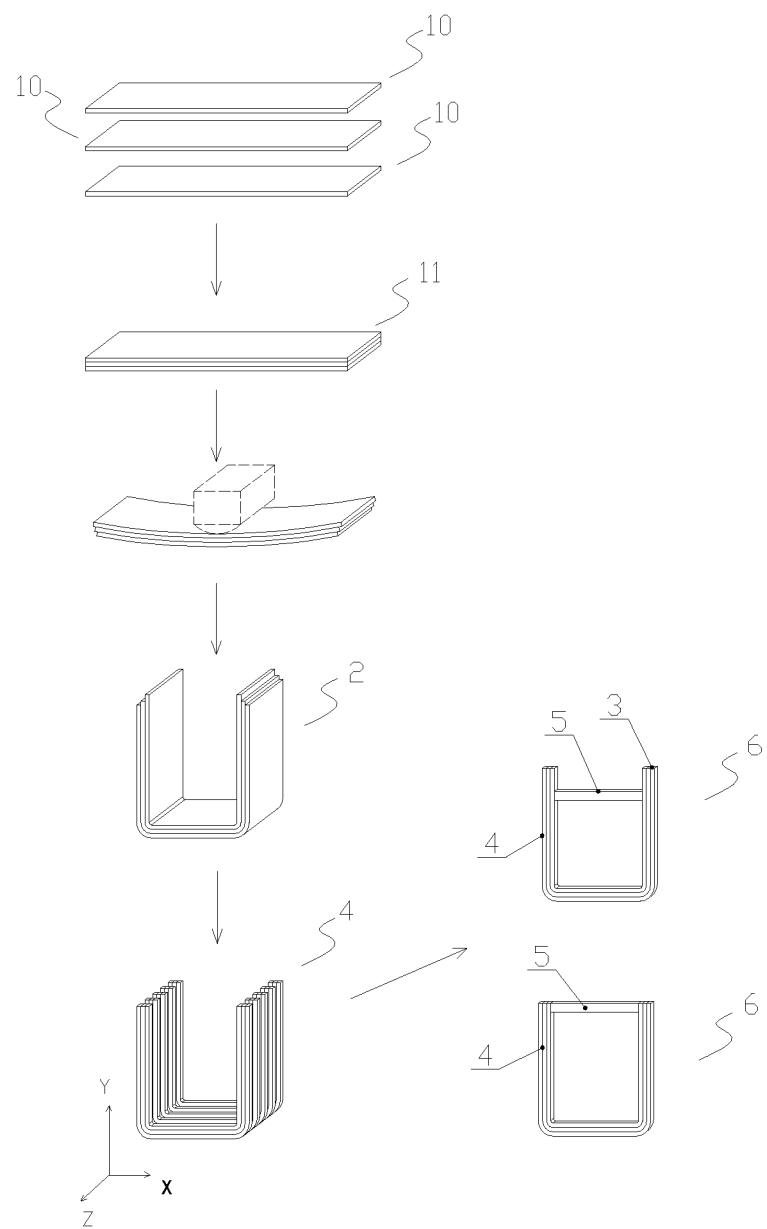
FIG. 2 is a schematic diagram showing the process for producing a bamboo framework body by using single bamboo boards in the second embodiment.

As shown in FIG. 2, three single boards 10 in FIG. 2 are taken as an example.

A method for shaping a framework body using three single boards 10 includes the following steps.

S1: gluing and successively stacking the three single boards 10 to form a three-layer superposed board 11; shaping a bent three-layer superposed board 11 on a special shape forming machine to make into a U-shaped board 2; the special shape forming machine is provided with a microwave heating device to heat the three-layer superposed board uniformly.

S2: trimming two ends of the U-shaped board 2, such that its end portion is smooth; or processing the two ends of the U-shaped board 2 into supporting end portions 3.

S3: cutting the U-shaped board 2 into several U-shaped units 4.

S4: arranging a connecting rod 5 at an opening of the U-shaped unit 4, to form a closed bamboo framework body 6; or arranging a connecting rod 5 close to an opening of the U-shaped unit 4, thereby forming the bamboo framework body 6 with a supporting end portion 3. The final finished product is formed by grinding, polishing and painting the formed bamboo framework body 6.

The foregoing description only shows preferable embodiments of the present invention, and does not intend to limit the patent scope of the present invention. Equivalent structures or equivalent flows made in accordance with the specification and drawings of the present invention may be applied in other related arts directly or indirectly, and fall within the protection scope of the present invention.

I claim:

1. A method for manufacturing a bamboo framework body, comprising the steps of bending a bamboo board into a U-shaped board, cutting the U-shaped board into several U-shaped units, and finally arranging a connecting rod at or close to an opening of the U-shaped unit to make into a bamboo framework body.

2. The method for manufacturing a bamboo framework body according to claim 1, wherein prior to bending, the bamboo board is microwave heated and softened.

3. The method for manufacturing a bamboo framework body according to claim 1, wherein subsequent to bending the bamboo board into a U-shaped board, two ends of the U-shaped board are trimmed, such that its end portion is smooth; or the two ends of the U-shaped board are processed into supporting end portions.

4. The method for manufacturing a bamboo framework body according to claim 1, wherein the connecting rod is arranged at an opening of the U-shaped unit to form a closed bamboo framework body; or the connecting rod is arranged close to an opening of the U-shaped unit, thereby forming a bamboo framework body with a supporting foot.

5. A method for manufacturing a bamboo framework body, comprising the steps of gluing and stacking plural single bamboo boards and laminating them into a U-shaped board directly; cutting the U-shaped board into several U-shaped units; and finally arranging a connecting rod at or close to an opening of the U-shaped unit to make into a bamboo framework body.

6. The method for manufacturing a bamboo framework body according to claim 5, wherein prior to bending, the bamboo board is microwave heated and softened.

7. The method for manufacturing a bamboo framework body according to claim 5, wherein subsequent to bending the bamboo board into a U-shaped board, two ends of the U-shaped board are trimmed, such that its end portion is smooth; or the two ends of the U-shaped board are processed into supporting end portions.

8. The method for manufacturing a bamboo framework body according to claim 5, wherein the connecting rod is arranged at an opening of the U-shaped unit to form a closed bamboo framework body; or the connecting rod is arranged close to an opening of the U-shaped unit, thereby forming a bamboo framework body with a supporting foot.

* * * * *